(12) United States Patent
Srocka

(10) Patent No.: US 12,025,424 B2
(45) Date of Patent: Jul. 2, 2024

(54) DEVICE AND METHOD FOR MEASURING HEIGHT PROFILES ON AN OBJECT

(71) Applicant: SENTRONICS METROLOGY GMBH, Mannheim (DE)

(72) Inventor: Bernd Srocka, Erfurt (DE)

(73) Assignee: SENTRONICS METROLOGY GMBH, Mannheim (DE)

( * ) Notice: Subject to any disclaimer, the term of this patent is extended or adjusted under 35 U.S.C. 154(b) by 277 days.

(21) Appl. No.: 17/630,063

(22) PCT Filed: Jul. 17, 2020

(86) PCT No.: PCT/EP2020/070349
§ 371 (c)(1),
(2) Date: Jan. 25, 2022

(87) PCT Pub. No.: WO2021/013747
PCT Pub. Date: Jan. 28, 2021

(65) Prior Publication Data
US 2022/0268569 A1 Aug. 25, 2022

(30) Foreign Application Priority Data

Jul. 25, 2019 (EP) ..................................... 19188318

(51) Int. Cl.
*G01B 11/06* (2006.01)
*G01N 21/88* (2006.01)
(52) U.S. Cl.
CPC ..... *G01B 11/0608* (2013.01); *G01N 21/8806* (2013.01); *G01N 21/8851* (2013.01)
(58) Field of Classification Search
CPC ............ G01B 11/0608; G01B 11/2441; G01N 21/8806; G01N 21/8851; G01J 3/45
See application file for complete search history.

(56) References Cited

U.S. PATENT DOCUMENTS

| 7,050,171 B1 | 5/2006 | Banerjee et al. |
| 2009/0009773 A1 | 1/2009 | Sugiyama et al. |
| 2011/0032503 A1 | 2/2011 | Sasaki |

FOREIGN PATENT DOCUMENTS

| CN | 109387155 A | 2/2019 | |
| DE | 19600491 C1 * | 7/1997 | ......... G01B 11/0608 |

(Continued)

OTHER PUBLICATIONS

Youichi Bitou, "Two-wavelength phase-shifting interferometry with a superimposed grating displayed on an electrically addressed spatial light modulator", 2005, Optical Society of America (Year: 2005).*

(Continued)

*Primary Examiner* — Maurice C Smith
(74) *Attorney, Agent, or Firm* — Oliff PLC

(57) ABSTRACT

An optical device for sensing a surface profile of an object surface of an object by means of interferometric distance measurement, including a beam splitter for splitting a light beam of a light source into first and second sub-beams, a beam divider for dividing each sub-beam into a reference and a measuring beam, a mirror for reflecting the two reference beams, wherein each measuring beam is directed onto a measuring area on the object surface for reflection and after reflection is directed as object beam to the beam divider, each reference beam reflected by the mirror and directed as mirror beam to the beam divider, the object and mirror beams each interfere and are each fed as an evaluation beam to a detector unit for evaluation. Further include a light source for generating a monochromatic light beam, a detector unit, a signal evaluation unit and for determining the surface profile.

17 Claims, 6 Drawing Sheets

(56) References Cited

FOREIGN PATENT DOCUMENTS

| DE | 69524298 T2 | 6/2002 |
|---|---|---|
| DE | 10 2014 108 886 B3 | 11/2015 |
| EP | 0 689 030 B1 | 12/2001 |
| EP | 3 477 252 A1 | 5/2019 |
| WO | 2019/081490 A1 | 5/2019 |

OTHER PUBLICATIONS

Kaiwei Wang, "Two-dimensional surface profile imaging technique based on a double-grating frequency shifter", Aug. 1, 2005 (Year: 2005).*
Luděk Lovicar, "Some factors that affect the surface measurement accuracy of a low-coherence interference microscope", 2006 (Year: 2006).*
Oct. 7, 2020 Search Report issued in International Patent Application No. PCT/EP2020/070349.
Oct. 7, 2020 Written Opinion issued in International Patent Application No. PCT/EP2020/070349.
Jan. 25, 2022 International Preliminary Report on Patentability issued in International Patent Application No. PCT/EP2020/070349.

* cited by examiner

DEVICE AND METHOD FOR MEASURING HEIGHT PROFILES ON AN OBJECT

The present invention relates to a device, a system and a method for measuring surface profiles or height profiles on flat objects, in particular on wafers in the semiconductor industry. The device comprises a beam divider for dividing a monochromatic light beam and directing a sub-beam to the object. The system comprises the optical device, a detector unit, a light source and a signal evaluation unit for determining the surface profile.

In many industries, surface profiles of flat products are measured optically using imaging techniques. In the semiconductor industry, for example, the surfaces of wafers are measured. Wafers are slices of semiconductor, glass or ceramic materials. In certain applications, they are typically inspected over their entire surface or at least over large partial areas. The circuits ("chips") are produced on the wafers, which circuits later fulfill a wide range of tasks in electronic devices for computing, sensor technology, controlling and monitoring.

For electrical contacting of the circuits, wires were fed from the chip housing to the chip in conventional processes and attached there to metal contact surfaces. With advancing miniaturization and ever greater integration, it has become state of the art to make the contacts by applying solder balls to the contact points on the chip. This is already done when the chip is still in the wafer composite, that is, the wafer has not yet been cut to separate the individual chips. The contacts can thus be distributed over the entire chip area ("ball grid arrays"). Contacting is carried out by inserting the chip into a housing provided with appropriate contact surfaces, wherein the solder is melted and the contact is established by heating and pressure. The uniform height of the solder contact balls is of decisive importance for successful contacting according to this method.

For this method, solder balls are currently being replaced by copper cylinders, which are only provided with a very thin solder cap for making electrical contacts. The contact structures can thus be made even smaller and placed more densely. Since the copper is not ductile like the solder, the permissible height tolerances for this newer method are significantly reduced.

It is therefore necessary to inspect the contact structures (solder balls or copper cylinders) for their height even more precisely than before. For this purpose, fast and accurate measuring methods are needed that allow a measurement of the contact structure heights that is precise and as complete as possible. The complete measurement of all contacts is considered particularly advantageous because even a single deviating contact can render the finished component unusable. Therefore, special emphasis is placed on a high measurement speed. Typically, current contact structures have diameters of several 10 μm with a strong downward trend. The aspect ratio (ratio of height to diameter) is usually around 1.

At the same time, methods are currently being developed for stacking several chips to form a composite. In doing so, the use of raised contacting structures is to be almost completely eliminated. These methods are being investigated both for integration in the wafer composite and for individual chips, each of which is placed onto a chip still in the wafer composite. For these methods, too, there is a great need for accurate and fast profile measurement in order to be able to guarantee the high demands on the planarity of the surfaces in the lower nanometer range.

The typical sizes for the contact structures of these methods are diameters in the single-digit μm range and profile heights of a few nm to several 10 nm.

Analogous tasks have to be solved for other structures and in other industries. Such tasks are, for example, the measurement of the height of conducting tracks and other structures on electronic boards (printed circuit boards) or the measurement of a multiplicity of mechanical-electrical system components (MEMS) such as acceleration, pressure and speed sensors or gyroscopes.

All these applications have a number of common features. There is a need in all of them for rapid testing of a large number of usually similar test samples, such as printed circuit boards, wafers, displays and similar objects. The use of sensors to generate profile and/or height data of the inspected structures is also the same for the applications. Furthermore, the applications considered here do not necessarily require a 3-dimensional image of high lateral resolution. In some cases, a value (such as the cap height of the contact ball and cylinders discussed above) is sometimes already sufficient for the inspection.

PRIOR ART

Conventional methods for height measurement use point sensors, line sensors or area sensors. Area sensors based on, e.g., deflectometry or white-light interferometers have the advantage of being able to sense an area as a whole. In deflectometry, the surface to be measured is used as a mirror through which a regularly structured light source is viewed. The height variation of the object is reflected in the distortion of the mirror image and can be extracted therefrom. The method is very fast but limited in its lateral resolution and therefore not or only conditionally applicable for the described task.

In white-light interferometry, a series of images must be taken at different distances from the object or from the interferometer mirror. This is altogether too slow for a full-surface inspection of a wafer. Line sensors use, e.g., triangulation, stereometry or chromatic confocal imaging. Each of these methods exhibits measurement artifacts when transitioning to small contacts, making accurate measurement difficult to impossible, or the methods are again too slow. The conventional application variants of point sensors require very precise positioning on the contact structure. Since the lateral placement of the contacts themselves is in the order of magnitude of the resolution of the sensors, this is time consuming and increasingly error prone.

DISCLOSURE OF THE INVENTION

It is an object of the invention to propose an improved system and improved device for sensing a surface profile of an object surface of an object by means of interferometric distance measurement, which in particular also allow measurement of the heights of small contact structures in a shorter time with high accuracy.

The object is achieved with an optical device having the features of claim 1, a system having the features of claim 3 and with a method having the features of claim 15.

According to one aspect of the present invention, an optical device comprises a beam splitter for splitting a light beam from a light source into a first sub-beam and a second sub-beam, a beam divider for dividing each sub-beam from the light source into a reference beam and a measuring beam, and a mirror for reflecting both reference beams. Each measuring beam is directed to a measurement region on the object surface for reflection, and after reflection, is returned to the beam divider as an object beam.

Each reference beam is reflected at the mirror and guided as a mirror beam to the beam divider. The mirror is designed such that the two reflected reference beams, thus, the mirror beams, have a phase difference. The object beam and the mirror beam each interfere after impinging on the beam divider and are each fed as an evaluation beam to a detector unit for evaluation. The two evaluation beams have a phase difference when they impinge on the detector unit.

According to the invention, the device comprises a detector unit for detecting the evaluation beams and a signal evaluation unit for evaluating the detected evaluation beams and determining the surface profile.

To determine the surface profile, each measuring beam is directed to a measurement area on the object surface for reflection and, after reflection, is directed as an object beam to the beam divider. Each reference beam is reflected at the mirror and directed as a mirror beam to the beam divider. The respective object beam and the corresponding mirror beam interfere after impinging on the beam divider and are each fed as an evaluation beam to a detector unit for evaluation.

The signal evaluation unit determines the intensities of the two evaluation beams and calculates a height profile of the surface by using the intensities of the two evaluation beams. For the height profile, the influence of the reflectance of the surface on the measured intensities is compensated for by calculation. As a result, a correct profile can be determined for object surfaces with not 100% reflectance as well as for object surfaces with different reflectance coefficients within an area to be measured.

According to another aspect of the present invention, the system for sensing the surface profile of an object surface of an object by means of interferometric distance measurement comprises a light source for generating a monochromatic light beam and the optical device described above.

According to the invention, the two evaluation beams impinging on the detector unit have a phase difference from which the surface profile of an object surface of an object can be concluded. In previous arrangements, which are also based on interferometric distance measurement, a so-called optical trap is used to absorb at least one sub-beam after splitting a light beam into two sub-beams. The known arrangements are designed in such a manner that a non-interfering beam and an interfering beam are fed to a detector arrangement. From the evaluation of the two different beam types, a height profile is then inferred.

Within the context of the invention, however, it was recognized that it is also and especially possible to evaluate two interfering light beams with one detector unit and to record the height profiles from the measurement results by means of a signal evaluation unit. The detector unit has two detectors, preferably sensors or cameras. Such an arrangement according to the invention has the advantage that no optical trap (light trap) has to be used. An optical trap is an optical element that completely absorbs the radiation that occurs. In practice, this can only be produced at great expense and with great difficulty. If it is not possible to absorb almost all of the radiation, there are interference effects that can influence the measurement and falsify the result.

Within the context of the invention, it was further recognized that when two interferometric, thus, interfering beams are used, they must have a phase difference to allow evaluation. Preferably, the phase difference is not equal to an integer multiple of the wavelength used.

The device according to the invention and the system according to the invention have the advantage that by using two evaluation beams with a phase offset or a phase difference, which is preferably fixed, it is also possible to measure objects whose surface does not reflect 100% of incoming light. Thus, it is in particular also possible to measure surfaces that have a different reflectance in parts of their surface. For example, this is the case with objects that have different thicknesses or different materials. Wafers in the semiconductor industry in particular have a multiplicity of different material combinations locally, some of which also form partially transparent multilayers. Such thicknesses and material combinations can be measured precisely and quickly by means of the device according to the invention and the system according to the invention.

According to the invention, a reference beam is generated from each of the two sub-beams. In a preferred embodiment, the phase difference is thus generated so that each of the reference beams (first reference beam from the first sub-beam and second reference beam from the second sub-beam) impinges on a mirror, e.g. with two mirror segments or partial mirrors or mirrors, and is reflected there, with the mirrors or mirror segments having different positions. Preferably, the mirror surfaces are arranged parallel to each other, with the position of the mirror surface in the direction of the surface normal being different. The mirrors therefore have an offset in the direction of the surface normal. This results in transit time differences between the reference beams or the reflected so-called mirror beams, which leads to the phase difference.

In contrast to the optical trap, where most of the radiation is absorbed, the mirror reflects most of the radiation. At least 30% of the radiation is reflected, preferably at least 50%, more preferably at least 80%, particularly preferably at least 95%.

In a preferred embodiment, a mirror is used that comprises two parallel mirror segments whose mirror surfaces are also offset in the direction of the normal. Alternatively, the mirror segments can be mirrors in their own right. It is also possible to apply the mirror surface onto an optical element, for example a transparent block, a glass block or acrylic glass block, for example by vapor deposition.

In a particularly preferred embodiment, the beam divider and the mirror of the device according to the invention are integrated in an optical element. For example, the optical element can be formed from a transparent material or a glass block. For example, the optical element could comprise two transparent blocks each having a triangular base, preferably an equilateral and rectangular base area.

One of the blocks can be formed such that the lateral face has an offset at one of the legs of the triangular base, the outer faces being parallel but offset in the direction of their normal. The mirrors or mirror segments can be attached to these two offset faces, which are preferably of equal size and preferably aligned parallel. Preferably, the mirrors are vapor-deposited or applied onto the transparent block and their offset faces.

If the two transparent blocks are joined together such that their long lateral faces, which correspond to the lateral face at the hypotenuse of the triangular base area, are brought together and brought into contact, a beam divider can be formed. For example, the two transparent blocks can be glued together. One or both of the long lateral faces can be provided with a partially transparent mirror.

In a preferred embodiment, the light source comprises a laser that generates monochromatic light. If multiple light sources are used, the light beams of which are preferably bundled, each of the light sources comprises a laser.

In a preferred embodiment, multiple light sources are used, each generating a monochromatic light beam. Preferably, the light beams of the individual light sources have different wavelengths. Preferably, none of the light sources has a wavelength that is an integer multiple of the wavelength of another light source. Thus, the light beams of the individual light sources have different wavelengths that are preferably not an integer multiple of a wavelength of another light beam.

In a preferred embodiment with multiple light sources, the light beams of the individual light sources are bundled in a beam coupler so that the outgoing light beams comprise the light beams of all light sources. For example, the different light sources can produce light beams in different colors.

In a preferred embodiment, the beam divider comprises a semi-transparent mirror that allows part of an incident light beam to pass through as a reference beam and reflects another part of an incident light beam as a measuring beam in the direction of the object surface of an object, thus deflecting it. Preferably, a 50% dividing of the light beam into reference beam and measuring beam takes place.

Preferably, the detector unit of the system according to the invention comprises a time-delayed integration camera, a so-called TDI camera, which is preferably a TDI line scan camera. In a preferred embodiment, a TDI color camera or TDI color line scan camera is used. Particularly preferably, the detector unit has a TDI multi-channel line scan camera, which may be color or monochrome.

When splitting the light beams from the light source or light sources into two sub-beams, preferably two cameras or line scan cameras, preferably TDI cameras, are used in the detector unit. Since due to the arrangement overall of two sub-beams and their respective splitting into reference beam and measuring beam and subsequent superimposition of the reflected mirror beams or object beams to form evaluation beams means there are again two beams, in each case one beam is directed to each camera.

In a further preferred embodiment, an optical element is provided to split the bundled light beams, in particular the bundled evaluation beams. The optical element is arranged in such a manner that splitting the light beams takes place before they impinge on the detector unit and the cameras thereof. Splitting the bundled light beams, for example the bundled evaluation beams, can take place before or after separating the two evaluation beams and directing them to the respective cameras. It is also possible to perform a splitting of the bundled light beams after separation of the evaluation beams and directly before the beams enter the respective camera. Splitting is advantageous when cameras are used that are sensitive to the individual light beams and their wavelengths. When using multi-channel line scan cameras or TDI color cameras, such a splitting and such an optical element for splitting can be dispensed with.

According to the invention, the object is further achieved in that the light source continuously illuminates the object to be measured with light beams having at least one monochromatic wavelength;

the relative movement between the combined detector unit (so-called camera/interferometer arrangement) and the object is continuous and without interruption;

a fixed, suitably structured reference mirror creates a phase offset between two sub-beams of the light source;

with the detectors of the detector unit (e.g. the camera sensors of the interferometer arrangement), the intensity of both sub-beams of the light produced in each case by interference of the light reflected by the object (object beam) with the light created with light (evaluation beam) reflected by the reference mirror (mirror beam) is measured simultaneously at all wavelengths used;

the measured intensity of the first sub-beam interference signal (first evaluation beam) is corrected at each wavelength by means of the measured intensity of the second sub-beam interference signal (second evaluation beam) modified by the fixed reference phase offset; and the distance to the object is calculated from the corrected interference signal intensities of the first sub-beam interference signal (first evaluation beam).

In such an arrangement, line sensors are preferably used as detectors for the interferometry measurement. As a result, a wide strip of the object can be measured continuously. One aspect of the invention is further the correction of the influence of the different surface materials of the object to be measured. In order to extend the measurement range to the ranges necessary for the profile heights to be measured, it is proposed to use multiple wavelengths simultaneously in the system according to the invention.

In the context of the invention, it was recognized that from the intensity measurement of a signal modulated by interferometry, the distance to the measurement object can be clearly determined with very high resolution. However, this is only true if the surface of the measurement object reflects 100% of the used light or if the reflectance is known exactly for each measurement point. If the object to be measured has semi-transparent layers, their thicknesses and optical properties (refractive index and absorption coefficient) at the wavelength used must also be known exactly for each measuring point for an absolute distance measurement. For a relative profile measurement, one could do without the exact knowledge of these values but would be limited to the fact that the thicknesses and materials must be exactly the same for all measurement points, or that their variation limits the measurement accuracy.

Therefore, in order to perform the surface profile of an object surface of an object, in particular height measurement on a wafer, interferometry is not readily applicable since the intensity of the measured interferometry signals additionally depends on the material of the structure to be measured and its environment. For example, the wafers to be measured locally have a multiplicity of different material combinations, some of which are also formed by partially transparent multilayers whose thickness and material variations make accurate and fast measurement with one or a few wavelengths impossible. Without knowledge of the local reflectance and the phase offset of the reflected light (evaluation beam) produced by the partially transparent layers, it is not possible to make a sufficiently accurate statement about the distance.

In order to correct the influence of the material-related local variation of the intensity of the reflected light, according to the invention, the interferometry measurement is carried out simultaneously with at least two sub-beams, which differ by a fixed phase offset.

If two sub-beams are used, the accuracy of the measurement can already be significantly increased since the influence of the reflectance can be eliminated. This is already sufficient for many tasks, e.g. in the case that there are no partially transparent layers on the measurement object or their influence can be neglected.

The use of more than two sub-beams can be used to improve the robustness of the measurement by increasing the data redundancy.

In the following, the correction for a single detector element and for a single wavelength $\lambda_1$ is shown by way of example with reference to a height measurement on a wafer and without loss of generality. In order to implement the profile measurement at high speed, line scan cameras with multiple detector lines are advantageously used. The signal $S_i$ arriving at the interferometry detector can be represented as $$S_i = q * R * \gamma * \left[1 + \cos\left(\frac{2\pi}{\lambda_1/2}(z_{ri} - z_s - \varphi)\right)\right] \quad (1)$$

Here, q denotes the intensity of the light source, R the effective reflection coefficient of the surface of the measurement object at the wavelength $\lambda_i$, $\gamma$ an instrument constant resulting from detector sensitivity, absorption and reflection losses at the optics, and $z_{ri}$ and $z_s$ the distances between the divider mirror of the interferometer and the reference mirror or the surface of the measurement object, and $\varphi$ the phase offset which can be created by partially transparent layers on the surface of the measurement object.

For the case of negligible phase offset $\varphi\sim 0$, the combination of two partial beam bundles results in i=1.2 for the ratio of the measured intensities:

$$\frac{s_2}{s_1} = \frac{1 + \cos\left(\frac{2\pi}{\lambda_1/2}(z_{r2} - z_s)\right)}{1 + \cos\left(\frac{2\pi}{\lambda_1/2}(z_{r1} - z_s)\right)} \quad (2)$$

This can be rearranged with $$\Delta z_r = z_{r1} - z_{r2}, \Delta z = z_{r1} - z_s \text{ and } p = \frac{2\pi}{\lambda_1/2}$$

to:

$$\frac{s_2}{s_1} = \frac{1 + \cos(p(\Delta z - \Delta z_r))}{1 + \cos(p\Delta z)} \quad (3)$$

To determine the real distance of the surface of the measurement object, $\Delta z$ has to be determined by solving the transcendental equation. Since $\Delta z_r$ is a known variable (or can be determined by a calibration measurement with a plane mirror instead of the measurement object), the surface profile of the measurement object can be determined as long as it does not have any perpendicular steps which are larger than half the wavelength of the light used.

When using only one wavelength for the interferometry measurement and the solution according to the invention presented so far, the distance working range of the measurement remains limited to half a wavelength of the light used. Outside this range, the relationship between intensity and distance becomes ambiguous, since from the signal intensity alone it is not possible to determine directly to how many periods the path difference between the reference beam and the object beam corresponds. Conventional interferometers solve this by determining a reference distance during initialization and subsequent continuous counting of the measured intensity periods. However, this is unsuitable for the use of a line-type interferometer according to the invention since a reference would have to be available which is better than half a wavelength parallel to the interferometer line array, and there should be no steps on the measurement object of more than half a wavelength in height. However, at least the latter is not given e.g. for the measurement of contact structures on wafers.

If, on the other hand, two or more different wavelengths are used, the working range can be extended within which the measurement can be performed unambiguously without a start reference and period counting since the different wavelengths have different periodicities and thus an unambiguous measurement can be made from the combination of the signals of the wavelengths used in a further range. Basic principles of such a method are presented in "Multi-Wavelength Interferometry for Length Measurements Using Diode Lasers" by K. Meiners-Hagen et all. The directly detectable working range A for two wavelengths $\lambda_1$ and $\lambda_2$ is:

$$A = \Lambda/2 = \frac{1}{2} * \frac{\lambda_1 * \lambda_2}{\lambda_2 - \lambda_1} \quad (4)$$

If not only the total intensity of the synthesized wavelength A is considered, but both wavelengths $\lambda_1$ and $\lambda_2$ separately, the working range A can be extended to a multiple of the wavelengths $\lambda_1$ and $\lambda_2$ (method of exact phase fractions).

However, the method presented in the above publication cannot be used in this way for a height measurement on a wafer since the intensity of the measured interferometry signals additionally depends on the material of the structure to be measured and its environment. The method according to the invention presented above solves this problem.

By means of the two phase-offset interferometry signals measured simultaneously, the interferometry measurements at the different wavelengths can each be corrected separately. The material dependency is thus eliminated. Subsequently, within the unique working range as shown in the above publication, the distance can be calculated individually for each point recorded with the line sensor array. Thus, a precise distance image of the surface is obtained. By using line sensors with high clock rates, a very high measuring speed can be achieved.

With the device and system according to the invention, profiles of up to several 100 µm in height can be sensed with a resolution up to below 0.1 µm. This is in particular sufficient for many requirements when measuring the semiconductor chips and wafers described at the beginning. Applications are, e.g., the measurement of the heights of the contact structures (solder balls or cylinders), measurement of the height of conducting tracks of the uppermost wiring level of the chips or the determination of the planarity on reconstructed wafers (wafers, which are assembled by embedding previously separated chips in a carrier material, usually epoxy). Analogous tasks also exist for other structures and in other industries. Such tasks are, e.g., the measurement of structures on electronic boards and printed circuit boards or the measurement of a multiplicity of mechanical-electrical system components (MEMS) such as pressure sensors, speed sensors or gyroscopes.

The arrangement enables simultaneous measurement at multiple points with suitable illumination of the measurement area on the object surface and the use of suitable line or area detectors. Unlike white light interferometry, for example, the measurement result is already achieved by a single measurement at different wavelengths without having to change the distance of the object or detector. This speeds up the measurement considerably.

Preferably, a receiving device is provided for receiving an object in the form of a wafer or other flat object with a flat object surface. In the receiving device, the flat object to be measured is positioned especially in such a manner that the object surface is illuminated with the measuring light in the desired manner.

Lasers can be used as radiation sources since they sufficiently provide monochromatic light with high radiation intensity. Because of their high radiation intensity within a very small wavelength range, lasers are particularly suitable as radiation sources for the present invention. However, one or more radiation source(s) with a spectrally broader bandwidth provided with corresponding spectral filter(s) can also be used. The use of multiple spectral filters also makes it possible to generate multiple wavelengths from one radiation source.

In particular, the invention can provide that the radiation sources generate light at wavelengths of which no wavelength is an integer multiple of the wavelength of any of the other radiation sources. For example, a wavelength is not exactly twice the wavelength of another radiation source. The smaller the difference in wavelengths, the larger the working range. However, in practice it must be taken into account that the radiation beams are never completely monochromatic and always have a bandwidth which must be considered when selecting the wavelengths.

Combining the radiation when using different wavelengths can be carried out using spliced optical waveguides or dichroic mirrors. Spliced optical waveguides are optical waveguides that are fused together in a certain section or are routed close to each other so that the light from one optical waveguide passes into the other optical waveguide. In dichroic mirrors, only the light of a certain wavelength range is reflected while the light of at least one other wavelength range is transmitted. Such mirrors can be dimensioned for use at different angles. The most common use occurs at 45°. Thus, with a suitable arrangement, the outgoing reflected light and the transmitted light can have the same direction of propagation.

The phase difference of light beams required for the arrangement (device and system) can be generated both by a difference of the path to be covered by the light beams and by the passage or reflection at different media.

One or more prisms, gratings or other spectral dispersive elements can be used to separate the light beams of different wavelengths. The spatial separation allows the signals to be recorded simultaneously, which allows a high measurement speed. However, temporal separation can also be achieved by successive execution of the measurement at the different wavelengths, wherein a greater measurement time is accepted.

A particularly preferred configuration of the invention provides that each of the detector arrangements comprises a multi-channel time delay integration (TDI) line scan camera. These cameras comprise multiple TDI blocks each sensitive to a particular wavelength range. Thus, the TDI arrangement can be used to generate a high signal-to-noise ratio and, at the same time, all wavelengths used can be measured simultaneously. This enables a particularly fast and very precise measurement. Likewise, however, single-channel TDI line scan cameras can also be used in the so-called area mode, thus, like a normal area scan camera, in that the different wavelengths used are distributed over the sensor area by a dispersive element, for example a prism. This allows the large width of the TDI detector line of, e.g., 16384 pixels to be used for high throughput and at the same time, the, e.g., 48, 96 or 256 lines of the TDI are available for simultaneous and separate recording of the different wavelengths. With this arrangement, a lower measurement speed is available due to the lower clock rate in this area readout mode. The same applies to the likewise possible use of normal area scan cameras.

In particular, it can be provided that the optical device used to generate the interference comprises a semi-transparent mirror which reflects part of the radiation at a first surface towards the object surface (measuring beam) and allows another part of the radiation (reference beam) to pass through. The reflected radiation can then be combined with the beam that has passed through. This can be done, for example, by reflecting the beam that has passed through (reference beam) back into itself at a mirror (as a mirror beam) and coupling it into the reflected beam (object beam) at the semi-transparent mirror. Such an arrangement is called a Michelson interferometer. However, other arrangements can also be used, such as a so-called Mach-Zehnder interferometer, in which the irradiated light is divided and recombined after reflection of a sub-beam at the sample surface.

The method according to the invention for sensing the surface profile of an object surface (30) of an object by means of interferometric distance measurement comprises multiple steps, such as emitting a monochromatic light beam by means of a light source in the direction of an optical device, splitting the light beam from the light source into a first and a second sub-beam by means of a beam splitter, dividing each sub-beam into a reference beam and a measuring beam, preferably by means of a beam divider, directing the reference beams to a mirror, reflecting the reference beams at the mirror and forming mirror beams having a phase offset. The mirror beams are directed to and reflected from the beam splitter. The measuring beams are directed to and reflected from a measurement area on the object surface thereby forming object beams that are directed to the beam guide. In further steps, the mirror beams and object beams interfere to form evaluation beams that have a phase offset. One step provides for detecting the evaluation beams, preferably by means of a detector unit, evaluating them, and preferably determining the surface profile of the object surface by means of a signal evaluation unit. In doing so, the two measured intensity values of the evaluation beams which both are reflected from the same location on the object surface, are used to compensate for the influence of the reflectance of the light beams at the object surface when determining the surface profile. In this manner, a correct profile of the surface is determined, on the one hand for object surfaces with not 100% reflection and on the other hand for object surfaces with different reflection coefficients within the area to be measured.

Preferably, the method creates a monochromatic inspection image for each wavelength from the determined reflection coefficients of the object surface. In doing so, the reflection coefficients are calculated from the previously determined height profile and the measured signal intensity of at least one of the beams (evaluation beams). Particularly preferably, however, the signal intensities of both evaluation beams are used.

In the following, the method is explained without loss of generality using the example of wafers. However, it can be used in the same manner for other flat objects or test objects for the measurement of surface profiles and profiles.

Preferred configurations of the invention are described in the dependent claims. It is understood that the above features and those still to be explained below can be used not only in the combination indicated in each case, but also in other combinations or individually, without departing from the scope of the present invention. In particular, the method for the device and the system for sensing the surface profile of an object surface of an object by means of interferometric distance measurement may be implemented according to the embodiments described in the dependent claims.

Hereinafter, an exemplary embodiment of the invention is described with reference to the accompanying figures. In the figures.

Figure 1:
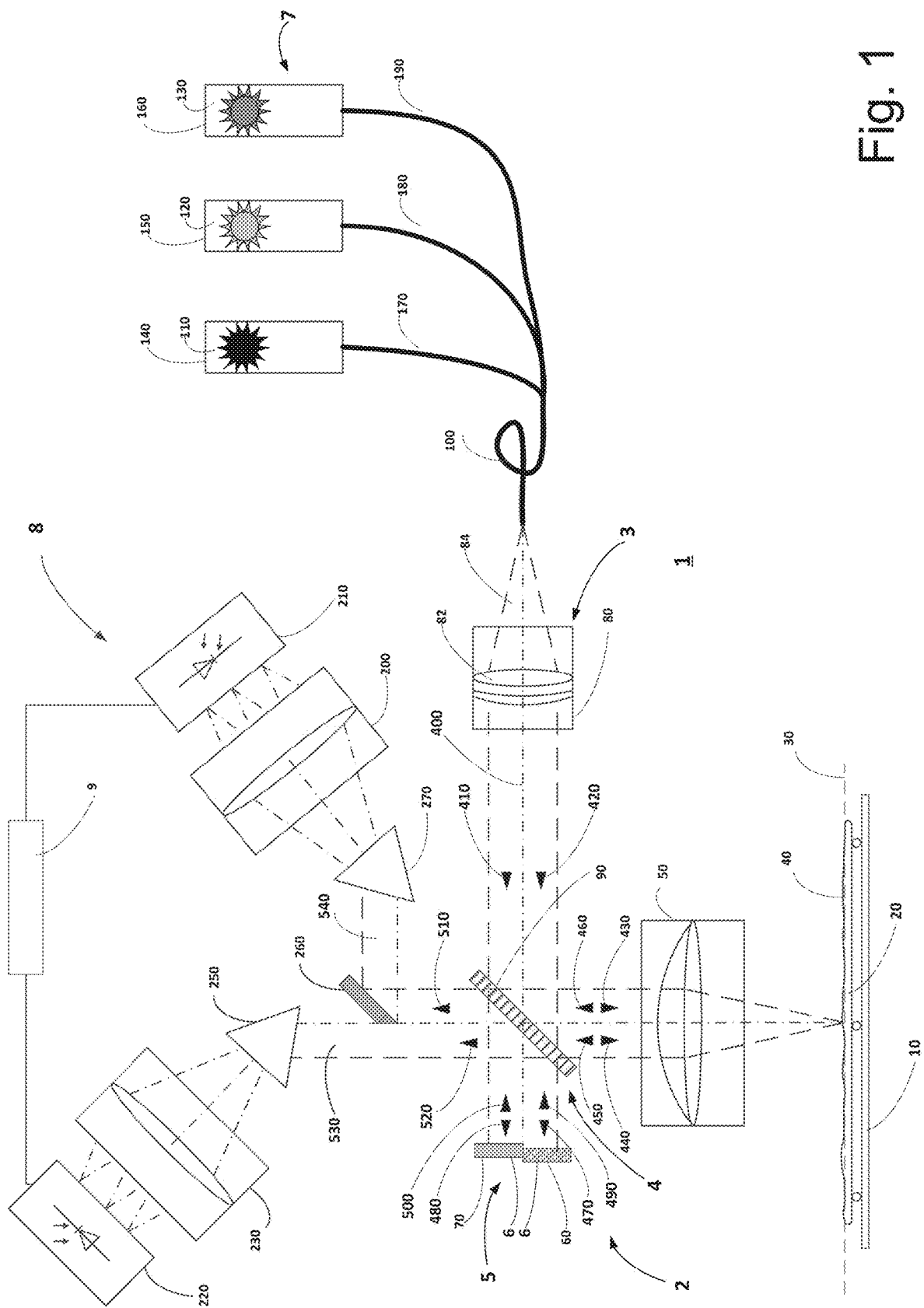
FIG. 1 shows a schematic illustration of a system according to the invention for interferometric distance measurement with three laser light sources.

FIG. 1 shows an embodiment of the system 1 according to the invention with an optical device 2, at least one light source 7, a detector unit 8 and a signal evaluation unit 9. The optical device 2 comprises a beam splitter 3, a beam divider 4 and a mirror 5. The mirror 5 has two mirror segments 6, which in turn are in the form of two mirrors 60, 70. The beam splitter 3 is preferably formed as a beam shaping optics 80. The beam divider 4 is preferably a partially transparent mirror 90 with preferably a 50% partial transparency. The at least one light source 7 preferably comprises three laser sources 110, 120, 130 as shown here.

In the following, the structure of the system 1 and the beam path in the system 1 are described using the example of a wafer as a measurement object. In the system 1, wafers 20 or other flat objects whose surface profile is to be sensed are moved in succession relative to a camera (detector unit 8).

In the present preferred embodiment, the camera is stationary and the objects are passed through below the camera. For this purpose, a holding and transport unit 10 supporting and moving the wafers 20 is preferably provided. The movement is preferably in a direction perpendicular to the surface normal of the object surface 30 of the wafer 20. In another exemplary embodiment, the camera can be moved. In an alternative exemplary embodiment, the relative movement can be divided between the camera and the object such that, for example, the camera preferably performs the movement in an axial direction while the object is preferably movable in the direction perpendicular thereto. The movement between camera and object is preferably continuous.

The exemplary embodiment in FIG. 1 uses three lasers as light sources 7 and two TDI multi-channel line scan cameras (TDI=time delay integration) as sensors or detectors of the detector unit 8. However, a different number of light sources can also be used. Likewise, a broader-band light source in combination with narrow-band filters can be used as an alternative.

Similarly, instead of TDI sensors, simple multi-channel line sensors (without TDI process) or area scan cameras or a set of multiple line scan cameras can be used.

In FIG. 1, the beam offsets generated when the beams pass through a plane-parallel plate are omitted to simplify the illustration. In the exemplary embodiment in FIG. 1, the light from the 3 laser sources 110, 120 and 130 is combined by a fiber coupler 100. In the fiber coupler 100, the 3 fibers 170, 180, 190 fed by the laser sources are spliced so that the light of the laser sources is emitted in a common, multicolor light beam 84. The transmission via a light guide serves only to decouple the lasers from the actual receiving system. Instead of light guide transmission, the laser beams can also be directed directly into the receiving unit via suitable optics, which reduces losses but requires more adjustment effort. Likewise, the combination of the three beams from the 3 laser modules can also be done via dichroic mirrors.

With the beam shaping optics 80, the light beam 84 is shaped into a parallel light bundle consisting of the two bundle halves, so-called sub-beams, 410 and 420 with cross-sections adapted to the receiving surface. The beam halves 410 and 420 are arranged around the beam center axis 400. They do not necessarily have to be adjacent to each other, i.e., a central region between them can remain unused. Splitting is preferably but not necessarily symmetrical. In this case, all wavelength components are evenly distributed over the entire cross-section and in particular between the bundle halves (sub-beams) 410 and 420. The light bundle (consisting of the sub-beams 410, 420) is directed by the 50% partially transparent mirror 90 in part as a sub-beam (measuring beams 430 and 440) onto the wafer surface 40 to be measured via a lens 50. The other 50% of the light beam (sub-beams 410, 420) pass through the partially transparent mirror 90 as sub-beams (reference beams) 470 and 480.

The reference beams 470 and 480 impinge on the two reference mirrors 60 and 70 where they are reflected. The resulting partial bundles (mirror beams 490 and 500) are again 50% reflected at the partially transparent mirror 90.

The partial beams directed onto the wafer surface 40, measuring beams 430 and 440, are focused by the lens 50 in a common imaging area. Due to the reflection at the wafer surface 40, they are reflected back through the lens 50 as partial bundles (object beams) 450 and 460. In this case, the first object beam 450 comprises the reflected light from the first measuring beam 430 and the second object beam 460 comprises the reflected light from the second measuring beam 440. Half of the light from each of the object beams 450 and 460 passes through the partially transparent mirror 90. The light originating from the first object beam 450 then interferes with the light from the first mirror beam 490 reflected at the partially transparent mirror 90 in a light bundle to form the first evaluation beam 520.

The intensity of the first evaluation beam 520 is now modulated by the interference of the light waves according to the difference in distance between the partially transparent mirror 90 and the mirror 60 on the one hand and the partially transparent mirror 90 and the wafer surface 40 on the other hand. The intensity modulation is performed independently for all three included wavelengths.

Similarly, an interferometry signal is generated from the light of the second object beam 460. After passing through the partially transparent mirror 90, the light originating from the second object beam 460 interferes with the light of the second mirror beam 500 reflected at the partially transparent mirror 90 in a light bundle, the second evaluation beam 510.

Figure 3:
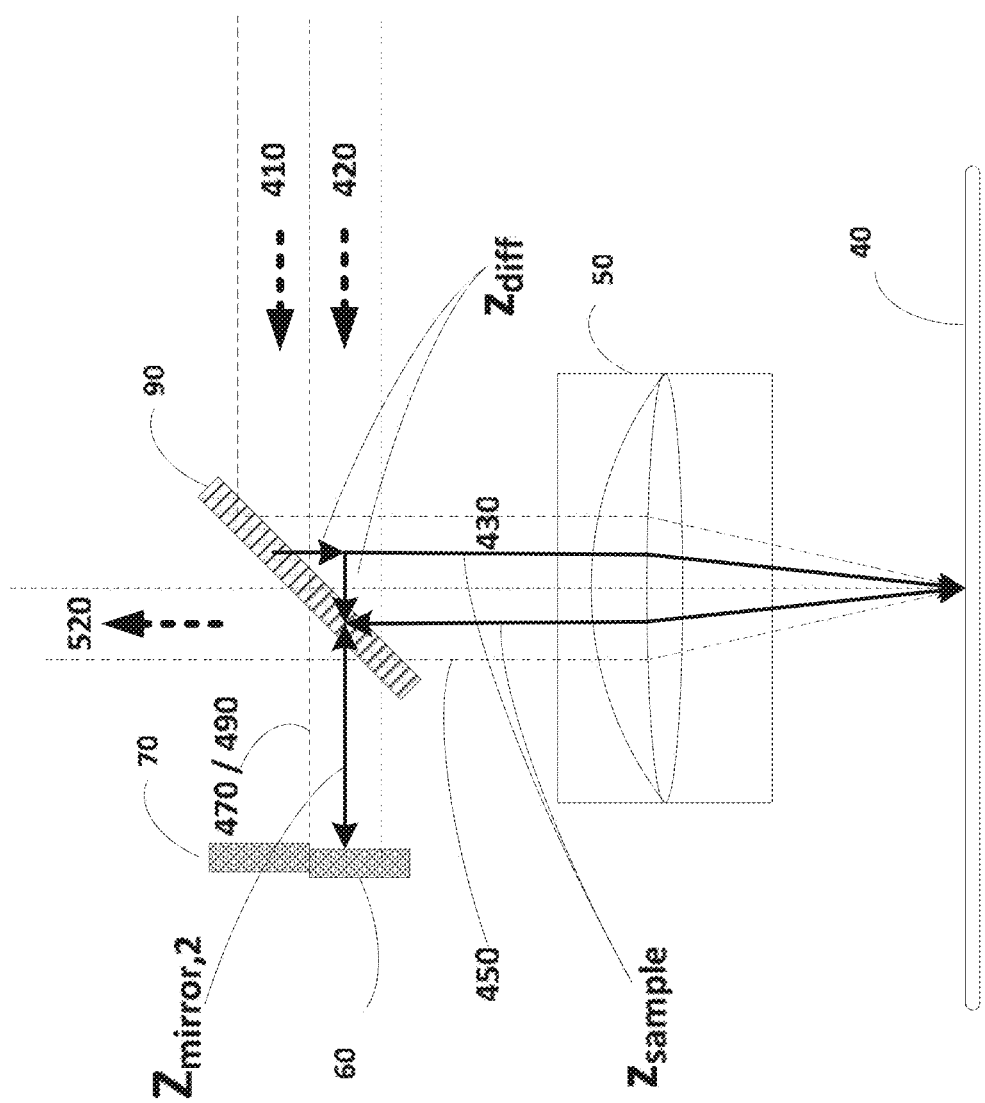
FIG. 3 shows a detailed illustration of the path lengths covered by a first sub-beam of light and the associated directions in an enlarged detail of FIG. 1.
Figure 4:
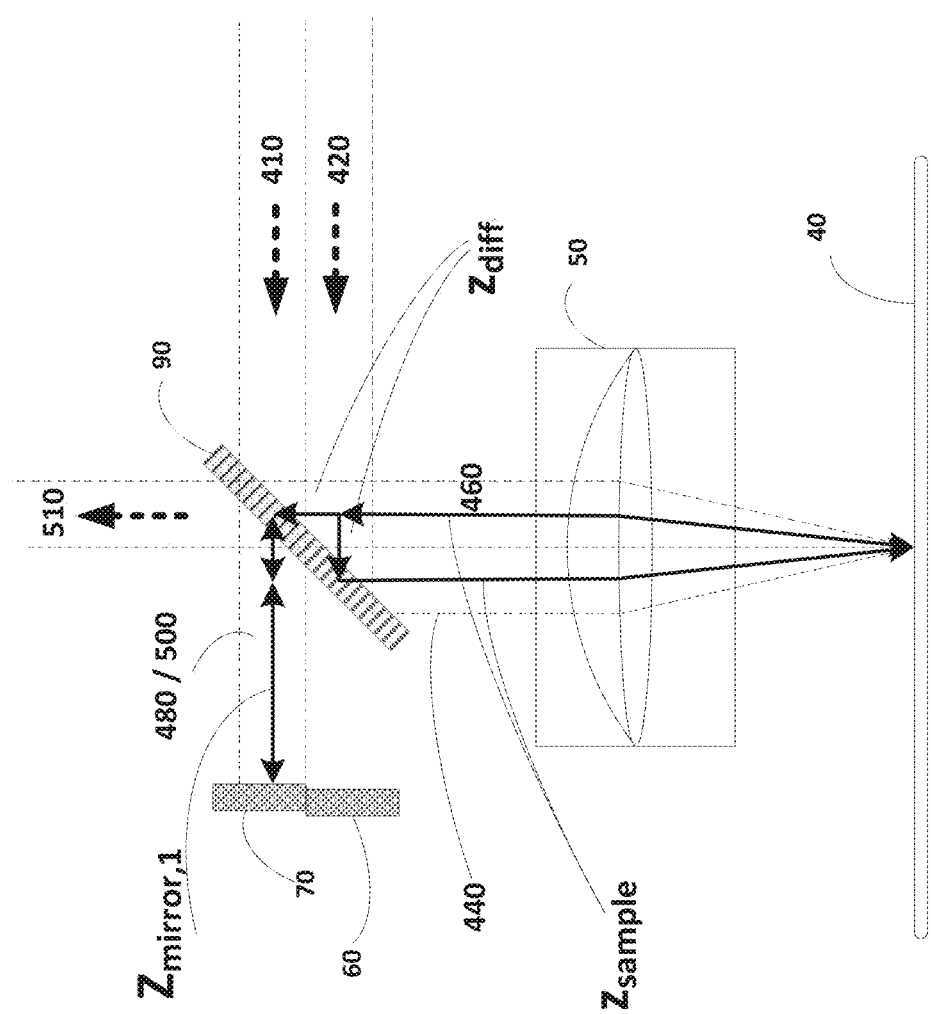
FIG. 4 shows a detailed illustration of the path lengths covered by a second sub-beam of light and the associated directions in an enlarged detail of FIG. 1.

The intensity of the second evaluation beam 510 is now modulated by the interference of the light waves according to the difference in distance between the partially transparent mirror 90 and the mirror 70 on the one hand and the partially transparent mirror 90 and the wafer surface 40 on the other hand. The intensity modulation is also performed independently for all three included wavelengths. FIGS. 3 and 4 show enlarged details of FIG. 1 to illustrate the formation of interference and the path differences that must be taken into account.

The two evaluation beams 510 and 520 differ in intensity in the three wavelengths used. The intensity difference of each wavelength considered by itself is determined exclusively by the phase offset generated at the mirrors 60 and 70. In the illustrated exemplary embodiment, the phase offset is generated by a different distance of the two mirrors 60 and 70 from the partially transparent mirror 90. However, the phase offset can also be generated in other ways, e.g. by coating one of the mirror segments 6 or the partial mirrors (e.g., mirror 70) with a transparent coating.

The second evaluation beam 510 is directed by mirrors 260 as a second detection beam 540 onto a prism 270. The prism 270 is used for spectrally splitting the light from the second detection beam 540 into the three wavelength components $\lambda_1$, $\lambda_2$ and $\lambda_3$. Another suitable dispersive element, such as a grating, can be used in place of the prism 270 without loss of generality. The spectral components split in this manner from the second detection beam 540 are focused by a first tube optics 200 onto a TDI multi-channel line scan camera 210. When using TDI multi-channel line scan cameras with color filters permanently installed in front of the sensor blocks, the spectral splitting of the beam can also be omitted.

By recording the light intensity impinging on each pixel of the line scan camera 210, three signals $i_{1,1}$, $i_{2,1}$ and $i_{3,1}$ are thus generated, the intensity of which is modulated by the profile height at the respective location of the wafer surface 40 and can thus be used for interferometric determination of the surface profile. Here, the first index represents the wavelength and the second index represents the camera 210 providing the signal.

Since mirror 260 blocks only the path of the second evaluation beam 510, the first evaluation beam 520, which is intensity-modulated by interference, impinges unobstructed as the first detection beam 530 onto prism 250. Prism 250 is used for spectral splitting of the light from the first detection beam 530 into the three wavelength components $\lambda_1$, $\lambda_2$ and $\lambda_3$. Another suitable dispersive element, such as, for example, a grating can also be used instead of prism 250 without loss of generality. The spectral components thus split from the first detection beam 530 are focused by a second tube optics 230 onto a TDI multi-channel line scan camera 220. By recording the light intensity impinging on each pixel of the line scan camera 220, three signals $i_{1,2}$, $i_{2,2}$ and $i_{3,2}$ are thus generated, the intensity of which is modulated by the surface profile of the wafer surface 40 and can thus be used for interferometric determination of the surface profile.

Figure 5:
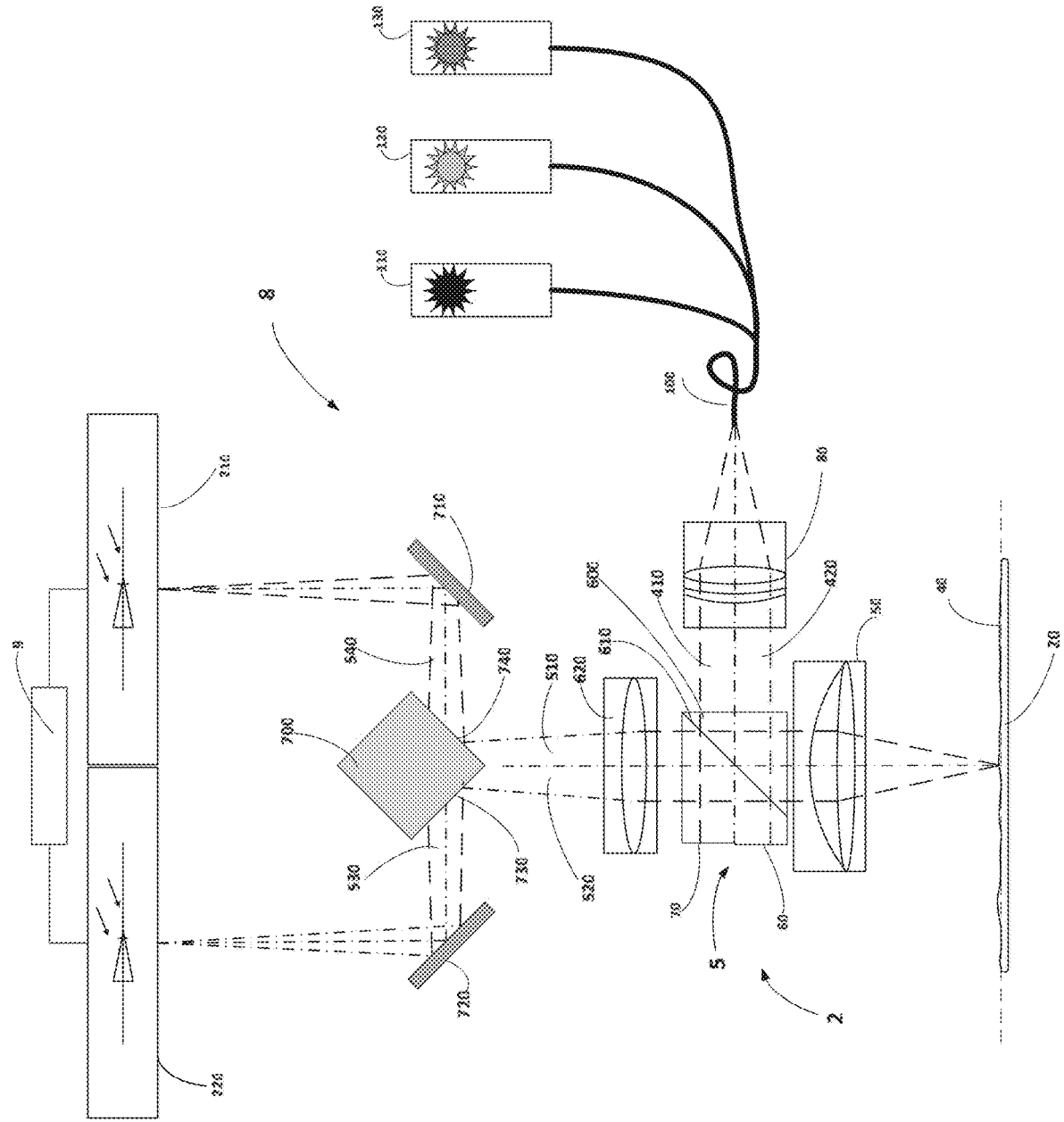
FIG. 5 shows a schematic illustration of a first embodiment of the system according to FIG. 1.

FIG. 5 shows an alternative embodiment of the system according to the invention in which the divider mirror 90 and the two mirrors 60, 70 (reference mirrors) are replaced by a prism 600 consisting of two blocks adhesively bonded together, a partially reflecting layer being provided on the adhesively bonded 45° surface. This layer forms the partially transparent mirror 610 which splits the two sub-beams 410, 420, as does the mirror 90 according to the embodiment of FIG. 1. The details and beam paths of the individual beams are described in FIG. 1 and are no longer shown in FIG. 5 for clarity.

The two mirrors 60, 70 present according to the embodiment of FIG. 1, which serve as reference mirrors, are provided on the outer surface of the prism 600. For this purpose, for example, mirror coatings can be vapor-deposited onto the outer surface or mirror surfaces can be applied or glued on. By appropriate construction of the prism 600, the necessary offset can be created on the outer surface so that the mirrors 60, 70 have the same offset as shown in FIG. 1.

After the mirror beams 490, 500 and the object beams 450, 460 interfere in the prism 600 to form the evaluation beams 520 and 510, these beams are bundled by means of a collimator optics 620 and directed to an optical element 700. The optical element 700 preferably has a rectangular or square base area. On the two sides facing the collimator optics 620, mirror coatings or mirrors 730, 740 are arranged to reflect impinging beams. The mirrors 730, 740 can also be formed as independent mirrors or reflective elements; however, they must then be aligned or adjusted.

Impinging beams are deflected at the optical element 700. At mirrors 730, 740, the two evaluation beams 520 and 510 are separated from each other and directed to cameras 210, 220. At mirror 730, the evaluation beam 520 is reflected into a first detection beam 530, which is directed to the first camera 210 by means of a deflection mirror 710. At mirror 740, the second evaluation beam 510 is directed to a deflection mirror 710 as a second detection beam 540 so that the second detection beam 540 impinges on the second camera 210. The signals recorded by the cameras 210 and 220 are processed in the signal evaluation unit 9 so that the profile of the wafer surface 40 of the wafer 20 is sensed.

In the embodiment shown here, the detection beams 530, 540 are also focused such that they impinge on the cameras 210, 220 at a single point.

Figure 6:
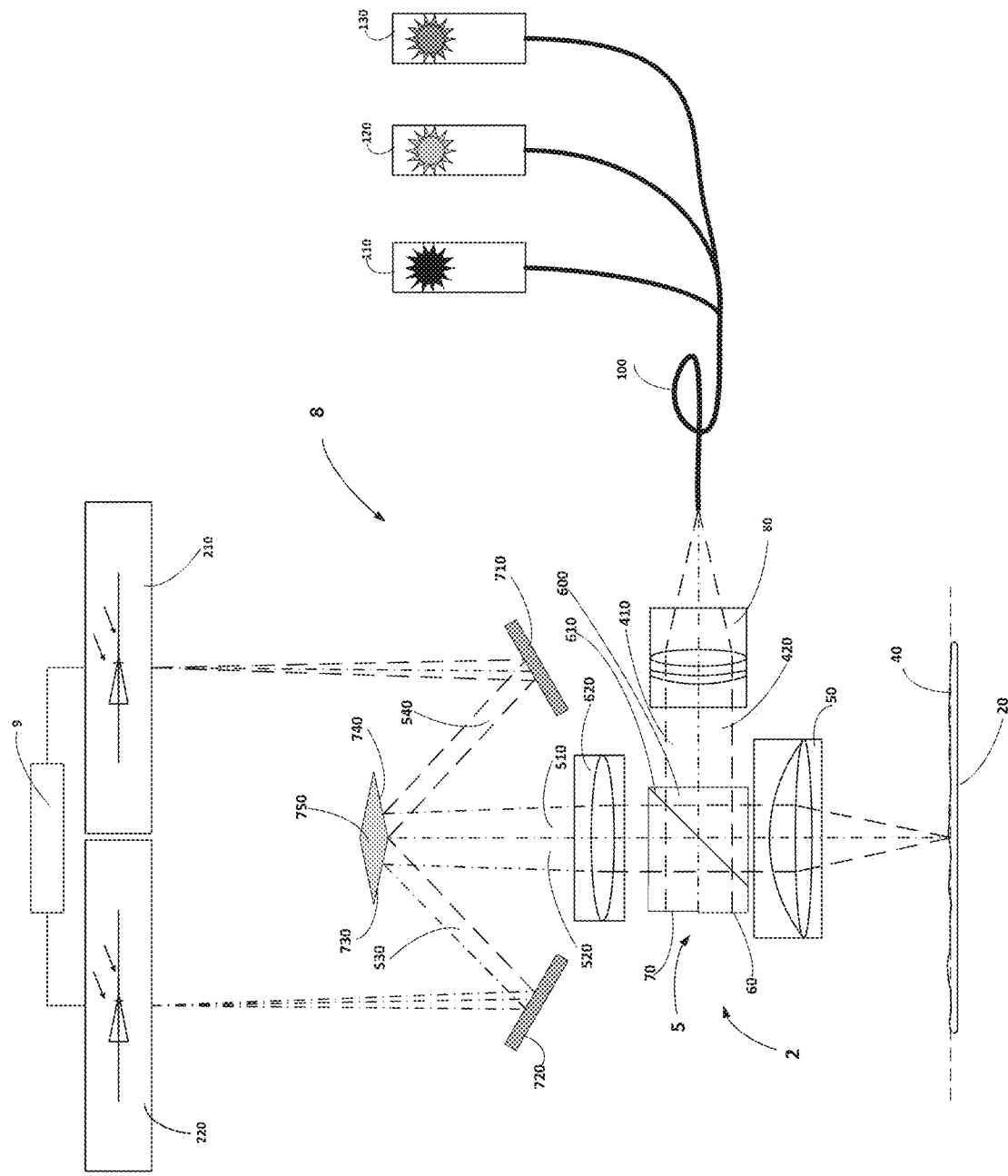
FIG. 6 shows a schematic illustration of a second embodiment of the system according to FIG. 1.

FIG. 6 shows an alternative embodiment of the system 1 according to the invention, which corresponds to the structure according to the embodiment shown in FIG. 5. The two embodiments of FIGS. 5 and 6 differ only in the use of the optical element that deflects the two evaluation beams 510, 520 into the detection beams 530, 540. According to FIG. 6, a flatter optical element 750 is used, so that no right-angled beam guidance is achieved, as is provided in the embodiment according to FIG. 5. According to FIG. 5, the evaluation beams are deflected by 90° to the two deflection mirrors 710, 720 which are arranged at an angle of 45° so that, the detection beams 530, 540, after they have impinged, are directed to the two cameras 210, 220 at an angle of 90°.

According to FIG. 6, a deflection other than 90° is effected by means of the optical element 750 and the two mirrors 730, 740 due to the arrangement of the mirrors 730, 740 on the diamond-shaped optical element's 750 side surfaces which are not arranged at right angles. The two deflection mirrors 710 and 720 are arranged accordingly so that the detection beams are directed, preferably focused, to a point on the respective camera 210, 220. This allows a much more compact measurement setup, so that the system can be made smaller and more compact and the accuracy of the measurements can be increased.

Of course, the prism 600 of FIGS. 5 and 6 can preferably also be used in an embodiment of the invention according to FIG. 1, replacing the partially transparent mirror 90 and the mirrors 60, 70. Also, the optical device 2 of FIG. 1 can be used in the embodiments according to FIGS. 5, 6.

Likewise, the detection unit according to FIG. 1, comprising the cameras 210, 220 and the prisms 275, 270, the tube optics 200, 230 and the mirrors 260 can be replaced by the detection unit according to FIGS. 5, 6, so that the collimator optics 620, the optical element 700 or 750, the mirrors 710, 720, 730 and 740 and the cameras 210, 220 are used. The same applies vice versa.

Signal Evaluation

The following explanation of the calculation of the surface profile from the obtained signals $i_x$, $r_x$ and $q_x$ with x=1, 2, 3 for the three wavelengths $\lambda_1$, $\lambda_2$ and $\lambda_3$ is performed only for one pixel of the camera sensors of the line scan cameras 210 and 220, respectively. It is understood that this calculation can be performed for each pixel of the cameras 210, 220. It is thus possible according to the sensor size and arrangement to determine a plurality of height points of the profile simultaneously.

For a line scan camera with, e.g., 16384 points per line available today, this means 16384 height values for each readout cycle of the cameras. Furthermore, in the arrangement described here, the line scan cameras 210, 220 can be moved continuously relative to the wafer 20. In accordance with the clock speed of the cameras, a corresponding number of lines with height information per unit time is obtained. Thus, at a clock rate of the proposed multi-channel TDI line scan cameras of, e.g., 100 kHz, more than 1600 million height values per second are obtained. Such cameras are offered by different manufacturers (e.g. by Vieworks and by Dalsa Teledyne). The use of such TDI multi-channel line scan cameras is a particularly suitable variant, since very high measurement speeds can be achieved. These cameras contain a plurality of (usually 4) TDI blocks in one camera, which can be operated and read out simultaneously. When using such cameras, recording the used wavelengths belonging to one line on the wafer surface will be done one after the other. This means that while the first TDI block records the line area at $\lambda_1$, the second TDI block determines the signal at $\lambda_2$ and the third TDI block the signal at $\lambda_3$.

In principle, this temporal offset is irrelevant for the calculation presented below. It is only necessary that the signal images obtained are assigned and evaluated in a phased manner (corresponding to the spatial offset of the TDI blocks). With this arrangement, high signal quality (correspondingly high-resolution and robust measurement) can be particularly well combined with high speed. Alternative arrangements are explained below.

Figure 2:
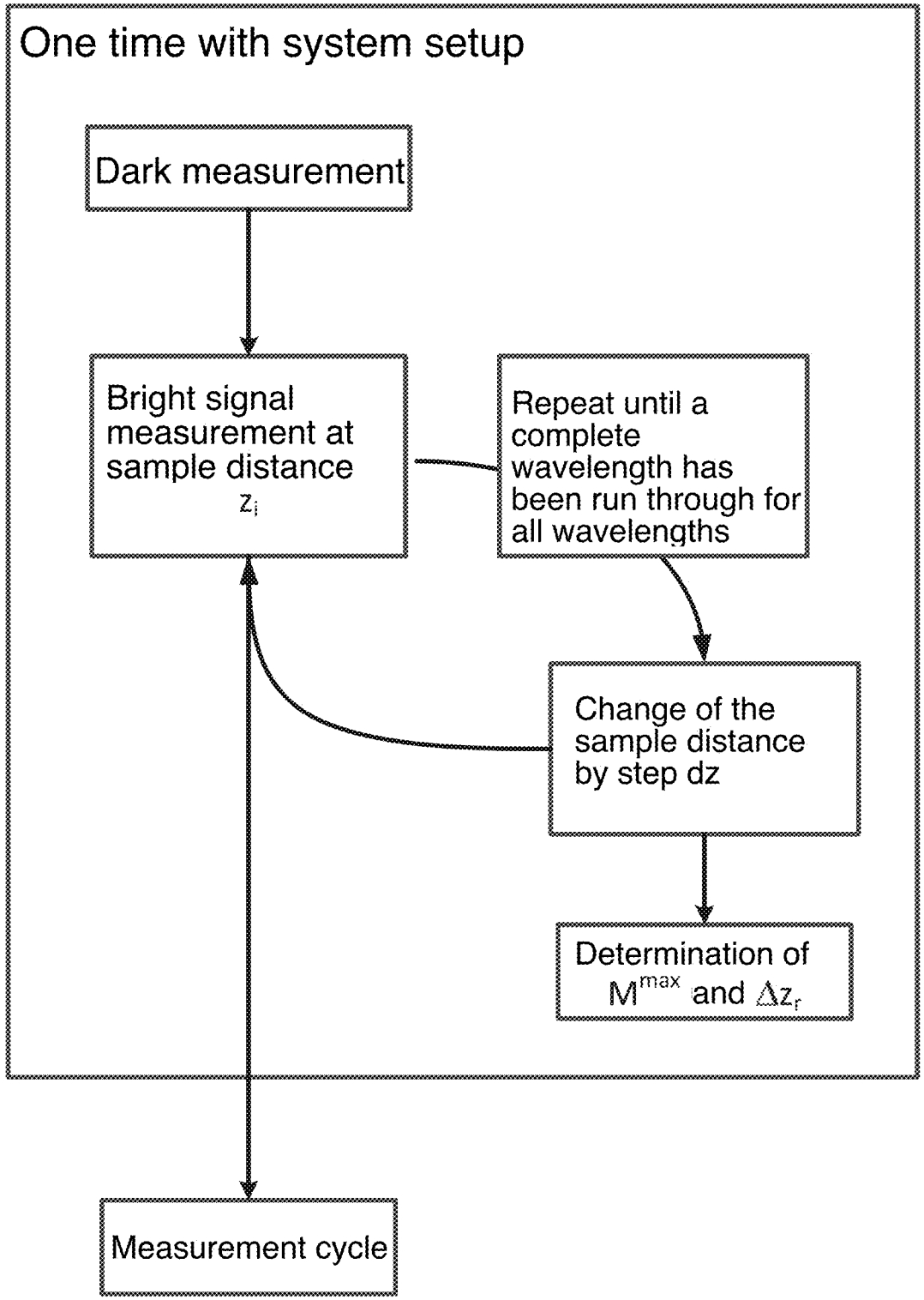
FIG. 2 shows a schematic illustration of method steps for setting up the system and for interferometric distance measurement.

The measurement procedure and its preparation is illustrated in FIG. 2. For a correct determination of the height values, the measurement must be prepared by means of a dark signal measurement and a determination of the transfer function of the optics and sensor system.

In the dark signal measurement, the signal d is measured with the light source switched off at each camera pixel y of the two line scan cameras 210 and 220. This determines the so-called dark noise of the camera, which represents an offset for each further measurement and is subtracted from the signal. This is done for both line scan cameras (sensor arrangements) 210 (index z=1) and 220 (index z=2).

$d_{xyz}$ signal value read out at wavelength $x(\lambda_x)$ at pixel y of the sensor z  (5)

To determine the optical and electrical transfer function of the arrangement (system 1), a bright signal measurement h is performed with a known planar object. For this purpose, the wafer surface 40 is replaced by a flat reference piece with known reflection properties. Since the signal h at each sensor pixel is uniquely determined by the intensity of the light source (signal value q), the transfer function M, the reflectance of the reference piece r, the path difference lz of the two interfering light beams (first object beam 450 and first mirror beam 490) (impinging on sensor (line scan camera) 220, z=2) or, respectively, second mirror beam 500 and second object beam 460 (impinging on sensor (line scan camera) 210, z=1) and the dark signal d, the transfer function M can be determined for each wavelength x, for each pixel y and for both sensors z as a function of the path difference, provided the values h, q and r are known. The transfer function is generally different for each wavelength x, each pixel y, and each camera z. It is determined by the sensitivity of the individual pixels, by the illumination, material properties, coatings and aberrations of the optics.

To check the output intensity of each laser light source 110, 120, 130 and include it in the calculation as a correction or reference value, the signals $q_1$, $q_2$ and $q_3$ of the monitor diodes usually installed in each laser module (on the side of the laser facing away from the output) 140, 150, 160 can be used directly.

The signal h of the bright reference measurement is:

$$h_{xyz,href}(l_z) = q_{xy,href} * M_{xyz}(l_z) * r_{x,ref} + d_{xyz} \quad (6)$$

Wherein:

$h_{xyz,href}(l_z)$ Measured value of the reference measurement at wavelength x at pixel y of sensor z (interferometer, line scan cameras 210 [z=1] and 220 [z=2]) as a function of path difference $l_z$.

$q_{xyz,href}$ Irradiated light intensity of the reference measurement at wavelength x at pixel y.

$M_{xyz}(l_z)$ Transfer function at wavelength x at pixel y of sensor z as a function of path difference $l_z$.

$r_{x,ref}$ Reflection coefficient of the reference measurement (known material) at wavelength x.

$d_{xyz}$ read dark signal value (no excitation light) at wavelength x at pixel y of sensor z.

Note: The dark signal values are "wavelength-dependent" despite "dark=no light" because different sensor pixels are used for the different wavelengths—they can have different dark count values.

Here, the argument $l_z$ denotes the path difference between the two interfering beams, thus, first object beam 450 and first mirror beam 490, impinging on line scan camera 220, z=2, or, respectively, second object beam 460 and second mirror beam 500, impinging on line scan camera 210, z=1.

FIG. 3 shows the ratios for the light bundle pair of first object beam 450 and first mirror beam 490. As can be seen from this, the path difference $l_2$ is just $2 \times (z_{mirror2} - z_{sample})$ since the path difference $z_{differenz}$ cancels itself out because each partial bundle (first measuring beam 430 and second partial beam 420) runs through it exactly once. The distance $z_{mirror2}$ of the reference mirror 60 carries the index 2 here since the two reference mirrors 60, 70, without loss of generality, have a different distance from the divider mirror 90 of the beam divider 4 for establishing the phase offset according to the invention.

Analogous ratios apply for the light bundle pair of second object beam 460 and second mirror beam 500, as shown in FIG. 4. Here, both partial bundles (first partial bundle comprising second sub-beam 420 and second object beam 460; second partial bundle comprising second reference beam 480 and second mirror beam 500) which interfere later, run through the path difference $z_{differenz}$ exactly 2 times, which in turn cancels it out, and the path difference l1 to be taken into account is just equal to $2 \times (z_{mirror1} - z_{sample})$.

To determine the distance of the wafer surface 40 from the sensor arrangement $z_{sample}$ (which corresponds to the optical device 2), slightly different methods can be used to define and use the transfer function. The selected method is used equally for both sensors line scan cameras 210 and 220.

On the one hand, the transfer function M(I) can be divided into a non-interfering factor $M^{max}$ and the interference effect. The factor $M^{max}$ is obtained by determining the transfer function M(I) only in its maxima. The intensity modulation due to the interference can then be determined directly from the values of the measurement run. This first way is further described in the following.

On the other hand, the intensity modulation due to the interference can be included in the transfer function M(I). M(I) is then determined in the reference measurement for the entire working range as a function of the path difference of the two bundles (first and second sub-beam) and the distance to the wafer surface. The distance difference to the wafer surface is determined in the measurement run by comparing the transfer function values with those of the bright signal measurement carried out as reference. This comparison is carried out in each case for the triplet of wavelengths x=1,2,3 and for both sensors z=1,2 and searches for the distance matching all three wavelengths and both sensors.

For the sensors line scan cameras 210 and 220, the transfer functions apply (where the /2 in the denominator results from the 2× run through the difference $z_{mirror}-z_{sample}$):

$$M_{xyz}(l_z) = M_{xyz}^{max} * \left(1 + \cos\left[\frac{2\pi}{\lambda_x/2} * (z_{mirror,z} - z_{sample})\right]\right) \quad (7)$$

Wherein:

$M_{xyz}(l_z)$ Transfer function at wavelength x at pixel y of sensor z as a function of path difference $l_z$.

$M_{xyz}^{max}$ Maximum value of the transfer function at wavelength x at pixel y of sensor z→constructive interference=path difference $l_z$=integer multiple of wavelength λ.

$z_{mirror,z}$ Distance of the divider mirror 90 from the mirror 60 and 70, respectively (cf. FIG. 4).

$z_{sample}$ Distance of the divider mirror 90 from the wafer surface 40 (cf. FIG. 4).

If the maximum signal values are determined for each of the three wavelengths x=1,2,3, $M^{max}$ can be determined for each wavelength:

$$M_{xyz}^{max} = \frac{h_{xyz,href}\left(l_{zfürh_{max(x)}}\right) - d_{xyz}}{q_{xy,href} * r_{x,ref}} \quad (8)$$

Wherein:

$l_{z\,for\,hmax\,(x)}$ Path difference at which the signal at sensor z is maximum, thus, $l_z$ is an integer multiple of the wavelength $\lambda_x$.

The determination of $M^{max}$ is done for each wavelength, e.g. by continuously changing the distance $z_{sample}$ of the reference piece and thus running through a full wavelength period for all three wavelengths x=1, 2, 3 and both sensors z=1, 2. In doing so, it can also be determined from the respective $z_{sample,y}$ positions, at which the maximum value occurs, how large the phase offset $\Delta z_r = z_{mirror,y} - z_{mirror2,y}$ of the two mirrors 60 and 70 is at each pixel y.

In the measurement run with the unknown wafer surface 40 to be examined, the sensor signals $i_{z1}$, $i_{z2}$ and $i_{z3}$ of the camera sensors 210 [z=1] and 220 [z=2] are now recorded simultaneously, as well as the output intensities of the laser light sources 110, 120, 130, by means of the built-in monitor diodes 140, 150, 160.

For the signals at the sensors, line scan cameras 210 and 220, the following applies:

$$i_{xyz} = q_{xy} * M_{xyz}(l_z) * r_{xy,wafer} + d_{xyz} \quad (9)$$

$$i_{xyz} = q_{xy} * M_{xyz}^{max} * \left(1 + \cos\left[\frac{2\pi}{\lambda_x/2} * (z_{mirror,z,y} - z_{sample,y})\right]\right) * r_{xy,wafer} + d_{xyz} \quad (10)$$

Wherein:

$i_{xyz}$ Interferometry measured value at wavelength x at pixel y of sensor z.

$q_{xy}$ Irradiated light intensity of the measurement at wavelength x at pixel y.

$M_{xyz}^{max}$ Maximum value of the transfer function at wavelength x at pixel y of sensor z→constructive interference=path difference $l_z$=integer multiple of wavelength $\lambda_x$.

$r_{xy,wafer}$ Reflection coefficient of wafer 20 at wavelength x at pixel y.

$d_{xyz}$ read out dark signal value (no excitation light) at wavelength x at pixel y of the sensor z.

With the relation $\Delta z_{ry} = z_{mirror1,y} - z_{mirror2,y}$ and the transformation $\Delta z_y = z_{mirror1,y} - z_{sample,y}$ the equations for the two sensors can be simplified to:

$$i_{xy1} = q_{xy} * M_{xy1}^{max} * \left(1 + \cos\left[\frac{2\pi}{\lambda_x/2} * \Delta z_y\right]\right) * r_{xy,wafer} + d_{xy1} \quad (11)$$

and $$i_{xy2} = q_{xy} * M_{xy2}^{max} * \left(1 + \cos\left[\frac{2\pi}{\lambda_x/2} * (\Delta z_y - \Delta z_{ry})\right]\right) * r_{xy,wafer} + d_{xy2} \quad (12)$$

Since for the profile measurement of the wafer surface 40, thus, sensing the surface profile of the wafer, the determination of $\Delta z_y$ is sufficient and the distance differences $\Delta z_y$ are known from the preliminary measurement for the determination of the maxima of the transfer functions $M^{max}$, this pair of signal equations (11), (12) defines for each pixel y a system of equations consisting of 6 equations (for the arguments applies: x=1, 2, 3 and z=1, 2) for the 4 unknown variables:

the three reflection coefficients $r_{xy,wafer}$ of the wafer surface 40, the sought distance difference $\Delta z_y$, which leads to the profile of the wafer surface 40.

By means of a suitable selection of wavelengths $\lambda_1$, $\lambda_2$ and $\lambda_3$ for x=1, 2, 3, a working range of 0.5 mm with unique assignment of the two intensity measurement value triples $i_{xy1}$ and $i_{xy2}$ to a path difference $\Delta z_y$ can be established without difficulty, which is sufficient for a variety of profile measurement tasks. This is explained in the publication by K. Meiners-Hagen, R. Schrodel, F. Pollinger and A. Abou-Zeid mentioned at the beginning. In the arrangement disclosed therein, for example, the wavelengths 532 nm, 632 nm and 780 nm are used and a working range of 0.6 mm with unique assignment of the distance difference is achieved.

To simplify the mathematical evaluation, the equations can be combined:

$$\frac{i_{xy1} - d_{xy1}}{i_{xy2} - d_{xy2}} = \frac{M_{xy1}^{max}}{M_{xy2}^{max}} * \frac{1 + \cos\left[\frac{2\pi}{\lambda_x/2} * \Delta z_y\right]}{1 + \cos\left[\frac{2\pi}{\lambda_x/2} * (\Delta z_y - \Delta z_{ry})\right]} \quad (13)$$

and with:

$$P_y = \frac{i_{xy1} - d_{xy1}}{i_{xy2} - d_{xy2}} * \frac{M_{xy2}^{max}}{M_{xy1}^{max}} \quad (14)$$

to:

$$P_y * \left(1 + \cos\left[\frac{2\pi}{\lambda_x/2} * (\Delta z_y - \Delta z_{ry})\right]\right) = 1 + \cos\left[\frac{2\pi}{\lambda_x/2} * \Delta z_y\right] \quad (15)$$

This reduces the task for each pixel y to the determination of $\lambda_{zy}$ from the remaining 3 equations, each of which must be satisfied simultaneously. By combining them, the intensities $q_{1y}$, $q_{2y}$ and $q_{3y}$ of the laser sources are no longer directly included in the calculation and the reflection coefficients $r_{xy,wafer}$ of the wafer surface 40 do not have to be explicitly determined.

If $\Delta z_y$ is represented in units of half wavelength, $\Delta z_y$ for each of the three wavelengths x can be represented as the sum of integer parts $\delta_x$ and the remainder $f_x$ as:

$$\Delta z_{yx} = \frac{\lambda_x}{2} * (\delta_x + f_x) \quad (16)$$

The sought path difference $\Delta z_y$ is determined from the $\Delta z_{yx}$ by determining the triple $\delta_x$ of integer parts for which the mean deviation of the associated $\Delta z_{yx}$ from the respective mean value is minimal.

Use of a Reference Profile for Height Measurement of Recurring Structures.

An important application of the height profile measurement presented here is the measurement of the heights of contact structures on wafers. Here, only the height of the structure is of interest in order to be sure during the later insertion and contacting of the chips in the package or during the 3-dimensional integration of multiple chips that all contact structures actually are in electrical contact and that none of the structures is so large that the chip is mechanically damaged during installation. For this purpose, it should be determined in each case whether the zenith points of all contact structures lie in one plane with a sufficiently low tolerance.

In order to achieve this task quickly and reliably, it is proposed to perform a high-resolution reference measurement on a few examples of the contact structures, to create a reference model of the contact structure from this and, for routine measurement of similar wafers, to take only as many measurement points as are necessary to make sure that some of them lie on the contact structure top side.

Such a reference model can be created using the same profile measurement method described above. For this purpose, in a first embodiment of the invention, the lens 50 can be an interchangeable lens with different magnifications. The reference measurement can then be performed with a high magnification. The reference model can be generated, for example, by averaging or median calculation from multiple measured contacts. The routine measurement can be carried out at a lower magnification so that just enough measurement points are determined on the contact surface to be able to make a reliable comparison with the reference model.

In another alternative method, the lens 50 can be a fixed lens with a fixed magnification. In this case, the reference measurement can be performed by multiple measurements with a small lateral offset. This again provides a denser measurement point coverage for the measured contact. The reference model can again be generated by averaging or median calculation from multiple measured contacts.

The comparison with a reference model for the determination of the zenith points has the advantage that a lower measuring point density can be selected. One is not dependent on always having to meet the zenith point itself as a measuring point. Rather, it is sufficient to use a few points, e.g. 5 to 10 points on the contact surface. These points can be located at arbitrary places on the contact. The zenith height is then determined by adjusting the model height to the measured points. This allows to work with a lower measurement point density overall and thus with a higher throughput while still obtaining a reliable measurement of the zenith heights of the contacts.

Use for Inspection

After determining the height profile of the surface, the values $\Delta z_y$ are known. Thus, from the intensity data $i_{xy1}$ of one of the channels, the values for the reflection coefficients $r_{xy,wafer}$ can be determined according to equation (11):

$$r_{xy,wafer} = \frac{i_{xy1} - d_{xy1}}{q_{xy} * M_{xy1}^{max} * \left(1 + \cos\left[\frac{2\pi}{\lambda_x/2} * \Delta z_y\right]\right)} \quad (17)$$

From this, a monochromatic image at the respective wavelength can be created for each wavelength x by merging the pixel values calculated in this way for all y-locations.

To improve the image quality, the intensity values of both channels (z=1, 2) can also be used according to equation (18) and an averaged image can be created.

$$r_{xy,wafer} = \frac{1}{2 * q_{xy}} * \left( \frac{i_{xy1} - d_{xy1}}{M_{xy1}^{max} * \left(1 + \cos\left[\frac{2\pi}{\lambda_x/2} * \Delta z_y\right]\right)} + \frac{i_{xy2} - d_{xy2}}{M_{xy2}^{max} * \left(1 + \cos\left[\frac{2\pi}{\lambda_x/2} * (\Delta z_y - \Delta z_{ry})\right]\right)} \right) \quad (18)$$

These images can be used for further tasks, such as searching for defects or checking the lateral alignment of the data images.

Embodiment Variants

Alternative embodiment variants are intended to be part of the invention without loss of generality.

Thus, the use of TDI technology in the explained invention serves only to improve the signal-to-noise ratio and is not necessary for the principle of the invention. For simpler requirements, therefore, instead of TDI multi-channel camera line sensors (line cameras 210 and 220), an arrangement of in each case three independent line sensor cameras or of three independent single-channel TDI line sensor cameras can also be selected. The further spatial splitting required for this embodiment can be achieved by increasing the respective distance between the prisms 250 and 270, respectively, and the tube optics 230 and 200, respectively. The tube optics 230 or, respectively, 200 can also be designed as 3 individual optics for this purpose.

Alternatively, conventional area scan cameras or TDI single-channel line scan cameras operated in area scan mode can be used. In such an arrangement, the clock frequency is reduced accordingly to, e.g. a clock of 1 kHz (for the described area readout mode of a TDI single-channel line scan camera) and more than 16 million height values per second are still obtained.

It is understood that when using area scan cameras or TDI single-channel line scan cameras in area readout mode, the three wavelengths 1, 2 and 3 are imaged on the camera sensors to different lines x=1, 2, 3. The assignment of the obtained signal images to each other which, at the three wavelengths, each look at the same point on the wafer surface 40, is carried out here by a spatial assignment of the areas of the camera sensor. For the evaluation shown in principle above, it is irrelevant whether the assignment is made spatially (for two-dimensional sensors) or in a phased manner (for line sensors).

It should be noted that for lateral high-resolution applications (e.g. in the single-digit μm range), a lateral and rotational correction for the recorded signal images is required anyway due to the use of multiple cameras, because an adjustment of the entire arrangement to an offset of the camera of less than 1 μm is hardly achievable in a mechanical manner. Such a mathematical correction can usually be made possible by recording a reference pattern from which the exact location on the wafer viewed by each pixel can be determined.

In further embodiment variants, the number of wavelengths used can be adapted to the required working range. For particularly small working ranges, an embodiment with only one wavelength is already possible, or for small ranges with two wavelengths. With only one wavelength, the use according to the invention of the two "sensor arms" shown serves to determine the reflectance of the sample and thus—in contrast to conventional multi-wavelength interferometry arrangements—enables the measurement of profiles with changing or unknown materials. For even larger working ranges or an improvement of the reliability by redundancy of the measurement, the extension to more than 3 wavelengths is suitable, which can be implemented in particular with the above mentioned multi-block TDI camera (cameras with 7 TDI blocks have already been presented).

In further embodiment variants, the combination of 2 interferometry sensors presented here (line scan cameras 210, 220) can also be divided into an embodiment of two successive measurements or implemented in two measuring heads to be used successively.

The illumination can be done suitably with continuously radiating monochromatic light sources. For this purpose, lasers are as suitable as other broader-band beam sources, which can be combined with appropriate interference filters. The only condition is that the coherence length of the light used is sufficiently large for the working range to be implemented.

For the method according to the invention, it is sufficient that a phase offset is created between the two beams, thus between the first mirror beam 490 and the second mirror beam 500 of the "reference arm", which is different from an integer multiple of the wavelength for all wavelengths used. This can be accomplished by spatially offsetting the mirrors 60 and 70, as shown in the exemplary embodiment. However, it is also possible to provide one mirror with one or two different coatings to create the phase offset. For example, a phase offset is created at an applied transparent layer by interference of the beams reflected at the front and back of the layer.

Likewise, instead of the beam divider 90, an adhesively bonded prism with a square cross-section can be used, which is provided with a partially mirror-coated layer in the adhesively bonded 45° surface. Thus, a partially transparent mirror is formed. When using such a prism, the "reference arm" can be created by vapor deposition of a mirror coating directly onto the outer surface of the prism. By applying two different layer thicknesses or different materials, the required phase offset can again be created. This arrangement results in a reduction of the interference contrast because of the clearly different dispersion in the "reference and measuring arm" of the interferometer; however, it is advantageous in any case at least for simple requirements because of its robustness. An embodiment with an adhesively bonded prism is shown in FIGS. 5 and 6.

The invention claimed is:

1. An optical device for sensing a surface profile of an object surface of an object by means of interferometric distance measurement, comprising
    a beam splitter for splitting a light beam of a light source into a first sub-beam and a second sub-beam;
    a beam divider for dividing each sub-beam of the light source into a reference beam and a measuring beam;
    a mirror for reflecting the two reference beams, which is designed to create a phase difference between the reflected beams;
    a detector unit for detecting evaluation beams; and
    a signal evaluation unit for evaluating the detected evaluation beams and determining the surface profile;
    wherein
    each measuring beam is directed to a measurement area on the object surface for reflection and after reflection is directed as an object beam to the beam divider;
    each reference beam is reflected by the mirror and directed as a mirror beam to the beam divider; and
    the object beam and the mirror beam each interfere after impinging on the beam divider and are each fed as an evaluation beam to a detector unit for evaluation;
    the signal evaluation unit is designed to determine the intensities of the two evaluation beams; and
    the signal evaluation unit is designed to determine, by using the intensities of the two evaluation beams, a height profile of the surface for which the influence of the reflectance of the surface on the measured intensities is compensated by calculation and thereby to determine a correct profile for object surfaces with not 100% reflection as well as for object surfaces with different reflection coefficients within an area to be measured.

2. The device according to claim 1, wherein the signal evaluation unit is designed to determine the phase difference of the two evaluation beams and to determine the height profile of the surface from the intensities and the phase difference of the two evaluation beams.

3. A system for sensing the surface profile of an object surface of an object by means of interferometric distance measurement, comprising
    a light source for generating a monochromatic light beam; and
    the optical device according to claim 1.

4. The device according to claim 1, wherein the mirror has two parallel mirror segments 6, the mirror surfaces of which are offset in the direction of the normal.

5. The device according to claim 1, wherein the beam divider and the mirror are integrated in an optical element.

6. The device according to claim 5, wherein the optical element, the prism is formed from two glass blocks resting against each other, and two mirror surfaces or mirrors are applied onto one side of a glass block.

7. The device according to claim 1, wherein the beam divider comprises a semi-transparent mirror which allows a part of an incident light beam to pass through as a reference beam and reflects another part of an impinging light beam as a measuring beam towards the object surface.

8. The system according claim 3, wherein the light source is a laser.

9. The system claim 3, wherein a plurality of light sources for generating a monochromatic light beam are provided, the light beams of which have different wavelengths and no wavelength of a light beam is an integral multiple of the wavelength of another light beam, and the light beams of which are bundled in a beam coupler.

10. The device according to claim 1, wherein the detector unit comprises a time delay integration camera.

11. The device according to claim 1, wherein it comprises an optical element for splitting the bundled light beams that is arranged in such a manner that splitting the light beams takes place before they impinge on the detector unit.

12. The device according to claim 1, wherein a lens is arranged between the optical device and the object surface of the object for directing the measuring beams to a measuring area on the object surface.

13. The device according to claim 1, wherein the lens is an interchangeable lens with different magnifications or a fixed lens.

14. The device according to claim 1, wherein the system is a drive unit for generating a relative movement between the optical device and the object.

15. A method for sensing the surface profile of an object surface of an object by means of interferometric distance measurement, comprising the following steps:
   emitting a monochromatic light beam in the direction of an optical device by means of a light source;
   splitting the light beam from the light source into a first sub-beam and a second sub-beam by means of a beam splitter;
   dividing each sub-beam of the light source into a reference beam and a measuring beam by means of a beam divider;
   directing the reference beams to a mirror;
   reflecting the reference beams at the mirror and forming mirror beams which have a phase shift;
   directing the mirror beams to the beam divider;
   reflecting the mirror beams at the beam divider;
   directing the measuring beams onto a measuring area on the object surface;
   reflecting the measuring beams at the object surface and forming object beams;
   directing the object beams to the beam divider;
   interfering the mirror beams with the object beams and forming evaluation beams, wherein the evaluation beams have a phase difference;
   detecting the evaluation beams by means of a detector unit;
   evaluating the detected evaluation beams and
   determining the surface profile of the object surface by means of a signal evaluation unit;
   using the two measured intensity values of the evaluation beams which were both reflected from the same location on the object surface in order to compensate for the influence of the reflectance of the light beams on the object surface when determining the surface profile and thereby
   to determine a correct profile for object surfaces with not 100% reflection as well as for object surfaces with different reflection coefficients within an area to be measured.

16. The method according to claim 15, with the following steps:
   evaluating the detected evaluation beams and determining the phase difference; and
   compensating for the influence of the reflectance of the light beams on the object surface by means of the determined phase difference when determining the surface profile, wherein from the determined reflection coefficients of the object surface a monochromatic inspection image is created for each wavelength, wherein the reflection coefficients are calculated from the previously determined height profile and the measured signal intensity of at least one of the beams.

17. The method for optical inspection of an object surface for defects, wherein a defect evaluation is based on an inspection image determined by means of the method according to claim 16 and on a subsequent back-calculation to the reflection of the light at the object surface wherein the reflection $r_{xy}$ is obtained by:

$$r_{xy} = \frac{i_{xy} - d_{xy}}{q_{xy} * M_{xy}^{max} * \left(1 + \cos\left[\frac{2\pi}{\lambda_x/2} * \Delta z_y\right]\right)},$$

wherein $i_{xy}$=measured value at wavelength x at a pixel y of a sensor;
$d_{xy}$=dark signal value without excitation light;
$q_{xy}$=irradiated light intensity of the measurement;
$M_{xyz}^{max}$=maximum value of the transfer function at wavelength x at pixel y of the sensor; and
$\Delta z_y = Z_{mirror,z} - Z_{sample}$ wherein $z_{mirror,z}$=distance beam divider to reference mirror and $Z_{sample}$=distance beam divider to object surface.

* * * * *